US005503449A

United States Patent [19]
Cameron et al.

[11] Patent Number: 5,503,449
[45] Date of Patent: Apr. 2, 1996

[54] BEDLINER SPECIALLY CONFIGURED FOR RETAINING GREENSMOWER(S)

[75] Inventors: Gerald D. Cameron, Fonthill; Nicholas Hamm, Vineland, both of Canada

[73] Assignee: Deere & Company, Moline, Ill.

[21] Appl. No.: 290,412

[22] Filed: Aug. 15, 1994

[51] Int. Cl.$^6$ ..................................................... B60R 11/00
[52] U.S. Cl. .......................... 296/39.1; 296/39.2; 410/19; 410/36
[58] Field of Search ................................ 296/39.1, 39.2, 296/37.2; 410/44, 47, 19, 22, 32, 36, 42

[56] References Cited

U.S. PATENT DOCUMENTS

| | | | |
|---|---|---|---|
| 2,700,572 | 1/1955 | Torrance | 296/37.2 |
| 3,008,755 | 11/1961 | Hale | 296/37.2 X |
| 3,940,178 | 2/1976 | LeVeque | 296/37.2 |
| 4,215,898 | 8/1980 | Ulics | 410/32 X |
| 4,434,919 | 3/1984 | Flowers | 296/37.2 X |
| 5,137,322 | 8/1992 | Muirhead | 296/39.2 |
| 5,154,478 | 10/1992 | Erickson et al. | 296/39.2 |
| 5,265,993 | 11/1993 | Wayne | 296/39.2 X |

FOREIGN PATENT DOCUMENTS 0599572  11/1959  Italy ..................................... 296/39.1

OTHER PUBLICATIONS

Bell Turf Equipment Mfg. Brochure entitled "Green Cutting Convenience! with . . . Mower Mate", published in U.S.A., received 7 Apr. 1994.

*Primary Examiner*—David M. Mitchell
*Assistant Examiner*—Kia M. Robinson

[57] ABSTRACT

A bedliner is adapted for insertion in the cargo box of a trailer or utility hauling vehicle. The bedliner is formed of plastic and includes a plurality of sets of right- and left-hand, axially aligned notches elevated above a floor of the bedliner with each set being adapted for receiving opposite end portions of an axle of a greensmower so as the support the greensmower such that a rear roller and bedknife thereof is elevated above the floor while a front roller is resting on the floor. Wheel wells are formed in the bedliner outboard of the support platforms for receiving transport wheels that have been removed from the axle of a greensmower being transported.

8 Claims, 2 Drawing Sheets

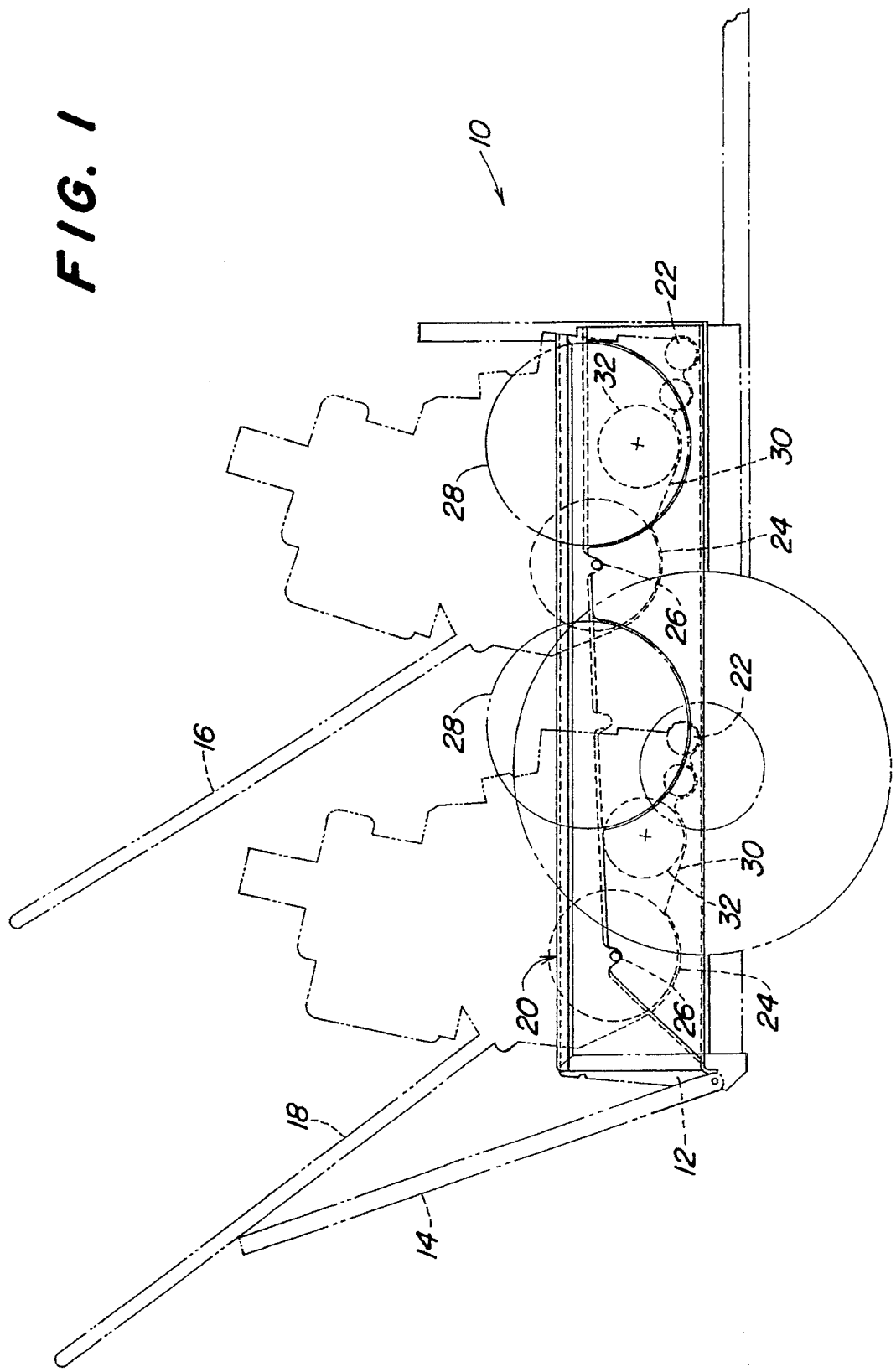

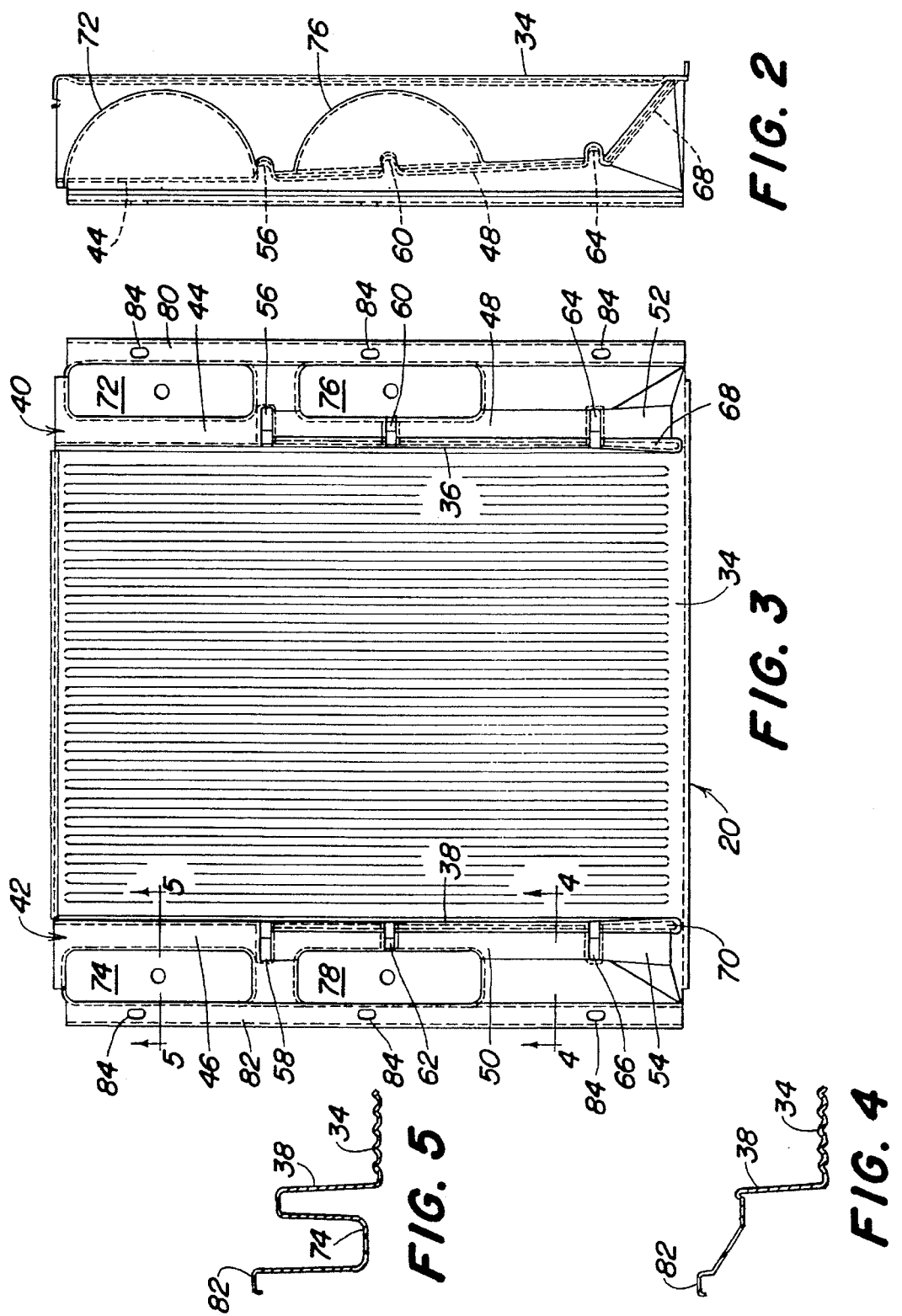

BEDLINER SPECIALLY CONFIGURED FOR RETAINING GREENSMOWER(S)

BACKGROUND OF THE INVENTION

The present invention relates to devices for transporting greensmowers and more specifically relates to devices for transporting walk-behind greensmowers.

Walk-behind greensmowers are commonly equipped with a relatively large rear roller or drive drum, a grooved or solid front roller and a cutting reel which operates against a bed knife located between the front and rear roller. Also, it is common to construct the greensmower to include a pair of transport wheels located on axles provided as extensions of a shaft carrying the large rear roller.

The grooming of greens to provide smooth putting surface requires greensmowers constructed to provide precision adjustments of height of cut and of bed knife to reel clearance. These components to be adjusted or the adjustment mechanisms themselves are prone to being damaged and/or disturbed during the transport of the greensmower among storage and various golf course greens to be groomed.

In order to avoid or reduce these problems during transporting a greensmower, it is known to provide a two-wheel trailer equipped with a structure for clamping the greensmower at three points in such a way as to suspend the reel, bed knife and drive drum. Two of the points of suspension are defined by a pair of upright, transversely spaced posts having recesses in the tops thereof for cradling the transport wheel axle, sans transport wheel. Clamps are provided for holding the axles in the recesses.

These trailers have the disadvantage of being dedicated equipment since their construction does not lend to them being used for other purposes. Also, the trailers are constructed of metal which requires that extreme care be taken when loading or unloading a greensmower lest the bed knife, reel or other delicate structure be accidentally impacted against surfaces of the trailer with sufficient force to cause damage. Furthermore, the trailers are constructed for hauling only one greensmower at a time and the clamps must be maintained so that they work properly.

SUMMARY OF THE INVENTION

According to the present invention there is provided a structure for use in transporting a walk-behind greensmower and more specifically there is provided a structure which is thought to overcome or at least diminish some of the aforementioned disadvantages of the prior art.

An object of the invention is to provide a structure for use in supporting the rear end of a walk-behind greensmower in an elevated position during transport, with the transporting structure being adapted for placement in the cargo box of a trailer or utility hauling vehicle, for example.

A more specific object of the invention is to provide a greensmower transporting structure formed as a bedliner adapted for placement in the cargo box of a trailer or utility hauling vehicle.

Yet another object of the invention is to provide a greensmower transporting structure in the form of a molded plastic bedliner.

Still another object of the invention is to provide a greensmower transporting structure, as defined in one or more of the foregoing objects, which is capable of retaining more than one greensmower and/or to retain the greensmower(s) without the need for additional clamps or retaining devices.

These and other objects of the invention will become apparent from a reading of the ensuing description together with the appended drawings.

BRIEF DESCRIPTION OF THE DRAWINGS

FIG. 1 is a right side elevational view of bedliner constructed for supporting a pair of greensmowers, with the bed liner being illustrated inserted in a cargo box of a trailer, with the trailer and a pair of greensmowers being shown in phantom.

FIG. 2 is a right side elevational view showing the bedliner of FIG. 1 removed from the trailer cargo box.

FIG. 3 is a top plan view of the bedliner shown in FIG. 2.

FIG. 4 is a vertical sectional view taken along line 4—4 of FIG. 3.

FIG. 5 is a vertical sectional view taken along line 5—5 of FIG. 3.

DESCRIPTION OF THE PREFERRED EMBODIMENT

Referring now to FIG. 1, there is shown a mobile vehicle in the form of a two-wheel trailer 10 including a cargo box 12 having a ramp 14 hinged at the rear end thereof for movement between a raised transport position, as shown, and a lowered loading position. Front and rear walk-behind greensmowers 16 and 18 are shown loaded in the cargo box 12 and supported on a bedliner 20, described in further detail below. Although only shown in outline, it is here noted that each of the greensmowers 16 and 18 is of a type including a small front roller 22, which may either be smooth or ribbed, and a somewhat larger, powered rear roller 24 mounted to an axle 26 which projects outwardly from opposite sides of the roller 24. Transport wheels 28, shown removed and stowed for transport, may be mounted on the opposite ends of the axle and retained by quick-release fasteners (not shown). Located between the front and rear rollers 24 is a bedknife 30 having a sharpened edge precisely adjusted relative to a reel 32 so that grass blades are cut off cleanly.

Now, returning to the details of the bedliner 20, it is noted that, for the sake of economy and for adding a measure of protection for greensmowers transported while cradled by the bedliner, the bedliner is preferably molded of plastic using a process requiring relatively inexpensive tooling. Referring now also to FIGS. 2–5, it can be seen that the bedliner 20 includes a ribbed floor 34 extending between and joined to the bottoms of right- and left upright walls 36 and 38, respectively. The distance between the walls 36 and 38 is chosen such that it will permit all but the outwardly projecting ends of the axle 26 of the greensmowers 16 and 18 to pass therebetween. Joined to and extending outwardly from the tops of the walls 36 and 38 are right- and left-hand fore-and-aft extending, narrow support platforms 40 and 42, respectively, including horizontal front sections 44 and 46, slightly downwardly and rearwardly inclined intermediate sections 48 and 50 and steeply downwardly and rearwardly inclined rear sections 52 and 54. Located at the juncture of the right-hand front and intermediate platform sections 44 and 48 is a right-hand front axle support receptacle or notch 56, and disposed in axial alignment with the notch 56 at the juncture of the left-hand front and intermediate platform sections 46 and 50 is a left-hand front axle support cradle or notch 58. Respectively located in axial alignment with each other in the intermediate platform sections 44 and 48 at locations about half way between the front and rear ends of the bedliner 20 is an intermediate set of axle support receptacles or notches 60 and 62. And respectively located at the rear ends of the right- and left-hand intermediate platform sections 44 and 48 is a rear set of axially aligned axle support receptacles or notches 64 and 66. The sets of notches 56–58, 60–62 and 64–66 are at such a height that when the ends of the greensmower axle 26 is cradled therein, as shown in FIG. 1, the large rear roller 24 will be elevated above and the small front roller 22 will be resting on the ribbed floor 34. In the case when the front roller 22 is ribbed, its ribs will cooperate with those on the floor 34 so as to resist sideways movement of the front of the greensmower. Further, it is to be noted that each of the notches 56 through 66 are stepped with the lower part of each notch being located towards its inside. These steps permit the axles of greensmowers having slightly different widths of cut to be mounted in the notches. Specifically, the axle end portions of the narrower of the greensmowers will be received in the lower part of each notch, with the extreme ends of the axles abutting the step so as to restrain sideways movement of the greensmower. The axle end portions of the wider of the greensmowers will be received in the upper part of each notch with the frame of the wider greensmower abutting the upright walls 36 and 38 so as to restrain sideways movement of the greensmower.

It is here noted that the fore-and-aft distance between the sets of notches 56–58, 60–62 and 64–66 is chosen such that when two greensmowers are being transported without grass catchers attached thereto, as shown in FIG. 1, the front and rear sets of notches 56–58 and 64–66 can be used with the greensmowers being completely out of contact with one another. When only one greensmower is being transported without a grass catcher, it is possible to place its axle 26 in the intermediate set of notches 60–62 and when only one greensmower with a grass catcher is being transported this can be done by placing the axle ends of the greensmower in the rear set of notches 64–66.

A stiffener rib 68 is located at the juncture of the right-hand upright wall 36 with the right-hand intermediate and rear support platform sections 48 and 52, and a stiffener rib 70 is similarly located at the juncture of the left-hand upright wall 38 with the left-hand intermediate and rear support platform sections 50 and 54. These ribs help the support platforms 40 and 42 bear the weight of the greensmower(s) cradled thereby. Located outboard of the front platform sections 44 and 46 are respective front wheel support wells 72 and 74. Similarly, respective second wheel support wells 76 and 78 are located outboard of and centered relative to the intermediate set of axle support notches 60 and 62. The right- and left-hand sides of the bedliner 20 are respectively defined by horizontal flanges or rails 80 and 82 which are engaged (FIG. 1) with complimentary shaped rails at the opposite side walls of the cargo box 12. Mounting holes 84 are provided in the flanges 80 and 82 for alignment with mounting holes (not shown) provided in the rails of the cargo box. Bolt and nut assemblies or similar fasteners would be used in conjunction with the mounting holes so as to hold the bedliner 20 in place in the cargo box 12.

While the operation of bedliner 20 in transporting the greensmowers 16 and/or 18 is thought to be apparent from the foregoing description, the operation is summarized as follows. If the greensmowers 16 and 18 are required to be transported to or from a work site or storage, for example, a trailer or utility hauling vehicle having a cargo box equipped with a bedliner 20 is parked in the vicinity of the greensmower(s) to be loaded and the loading ramp 14 lowered. If transport wheels 28 are mounted on the axle(s) 26 of the greensmower(s), they are removed and placed in the storage wells 72–74 and/or 76–78 of the bedliner 20. Each greensmower will then be supported on its front and rear rollers 22 and 24, respectively. Assuming it is desired to transport two greensmowers, the first greensmower 16 is rolled up the ramp 14 on its rollers 22 and 24. Just after the greensmower 16 leaves the ramp 14 and becomes completely supported by the floor 34 of the bedliner 20, outer end portions of the axle 26 will come into engagement with the steeply inclined rear sections 52 and 54 of the support platforms 40 and 42. The rear end of the greensmower 16 is then lifted and rolled forwardly on its front roller 22 with the ends of the axle 26 sliding along the stiffener ribs 36 and 38. The greensmower 16 will of course need to be lifted to either prevent the axle 26 from entering the rear and intermediate sets of notches 64–66 and 60–62, respectively or will need to be lifted from the recesses before further forward sliding of the axle can take place. When the axle 26 reaches the front set of notches 56–58 the greensmower 16 is properly placed for transport, with its bedknife 30 being elevated away from the floor 34 so as to diminish the chances of the precise setting between the bedknife and the reel 32 being disturbed or of the greensmower being damaged in some way. Furthermore, because the bedliner 20 is made of plastic, inadvertent contact of the bedknife 30 with the bedliner is not apt to result in damage thereto. The second greensmower 18 is then rolled up the ramp 14 and onto the bedliner floor 34 and then lifted so as to place the opposite ends of its axle 26 in the rear set of notches 64–66. The second greensmower 18 is then properly placed for transport. The location of the axle 26 of each of the greensmowers 16 and 18 results in the bulk of the weight of each greensmower acting to keep the axle in the desired set of notches without the need for additional clamps or retainers, It is here noted that when only one greensmower is to be transported, its axle 26 will be placed in the intermediate set of notches 60 and 62. This position, which is slightly forwardly of the trailer axle, yields the desirable result of the weight of the greensmower acting to urge the trailer tongue downwardly at its point of connection with a towing vehicle. Should it be desired to transport a greensmower with its grass catcher attached (these catchers are mounted to and project forwardly from the front of the greensmower), space for accommodating the grass catcher will be present if the greensmower axle is placed in the rear set of notches 64–66.

When the bedliner 20 is not being used to transport a greensmower, the open central area above the floor 34 will permit the trailer 10 to be used for hauling other items or material. Or, the bedliner 20 may be easily removed from the cargo box 12 after disassembling the fasteners (not shown) located in the mounting holes 84 along the flanges 80 and 82.

We claim:

1. In a combination of a bedliner supporting at least one walk-behind greensmower including front and rear rollers with the rear roller being mounted to a central portion of a support wheel axle having opposite end portions extending beyond opposite ends of said rear roller and adapted for having transport wheels releasably attached thereto, and with a reel and bedknife being located between the front and rear rollers, comprising: said bedliner including a floor having a width substantially equal to that of the rollers of said greensmower; right- and left-hand transversely spaced upright walls being joined to opposite sides of said floor; an upright front wall being joined to respective forward ends of said floor and right- and left-hand support walls; right- and left-hand support platforms extending outwardly from and being joined to the tops of said right- and left-hand upright walls; at least one set of right- and left-hand axially aligned upwardly opening notches being respectively provided in said pair of right- and left-hand support platforms and snugly cradling said opposite end portions of said wheel axle of said at least one greensmower; said at least one set of right- and left-hand notches being elevated above the floor sufficiently that said at least one greensmower is supported entirely on said wheel axle and said front roller with said reel and bedknife being elevated above said floor, whereby said reel and bedknife will be spaced above said floor so to prevent the latter from being damaged or having their relationship to each other altered due to contact between the floor and said reel or bedknife during transport of said at least one greensmower while contained in said bedliner.

2. The combination defined in claim 1 wherein a second set of right- and left-hand notches are respectively provided in said right- and left-hand support platforms rearwardly of said at least one set of right- and left-hand notches by a distance greater than the distance between said front roller and wheel axle of said at least one greensmower; and a second greensmower, constructed like said at least one greensmower, having wheel axle end portions snugly received in said second set of right- and left-hand notches.

3. The combination defined in claim 1 wherein each platform includes a rear ramp surface extending upwardly and forwardly from a rear end of said floor and being adapted for engagement by the opposite end portions of the wheel axles of said at least one and second greensmowers as the rear rollers Of the latter enter and roll forwardly on a rear end portion of said floor, whereby the ramps will aid in elevating the opposite end portions of said axles for placement in respective ones of said at least one and second sets of notches.

4. The combination defined in claim 2 wherein a third set of axially aligned right- and left-hand notches are respectively provided in said right- and left-hand support platforms at locations between said at least one and second set of right- and left-hand notches by a distance permitting a greensmower of a construction like said at least one and second greensmowers but having a grass catcher at its forward end to have its axle placed in the third set of right- and left-hand notches when no other greensmowers are supported by the bedliner.

5. The bedliner defined in claim 1 wherein at least two upwardly opening, substantially semi-cylindrical wheel wells are formed in the bedliner at respective locations outboard of the right- and left-hand support platforms.

6. The combination defined in claim 2 wherein two pairs of substantially semi-cylindrical wheel wells sized for holding one wheel each are formed in said bedliner, with one of each pair being outboard of said right-hand platform and one of each pair being outboard of said left-hand platform.

7. The Combination defined in claim 1 wherein each notch of said at least one and second sets of notches is stepped with an outboard portion of each notch being higher than an inboard portion of each notch, whereby another greensmower slightly narrower in width than said at least One greensmower may be carried by said bedliner with opposite axle end portions of said another greensmower respectively received in the inboard portions of said at least one and second sets of upwardly opening notches.

8. The combination defined in claim 4 and further including a two-wheel trailer including a wheel axle and a trailer box supported such that more than half of said box is forward of said wheel axle; said bedliner being positioned in said trailer box and having said front wall located at a forward end of said box; said third set of upwardly opening notches being located in said right- and left-hand platforms in a forward half of said bedliner, whereby placement of wheel axle end portions of a greensmower, similar in construction to said at least one and second greensmowers, in said third set of upwardly opening notches of said bedliner will result in the weight of such greensmower being located so as to tend to pivot a forward portion of said trailer downwardly about its axle.

* * * * *